United States Patent
Lee et al.

(10) Patent No.: US 9,631,263 B2
(45) Date of Patent: Apr. 25, 2017

(54) SLIDING BEARING WITH IMPROVED WEAR RESISTANCE AND METHOD OF MANUFACTURING SAME

(75) Inventors: Chung Rae Lee, Gyeonggi-do (KR); Dong Seob Shim, Gyeonggi-do (KR); Sang Beom Kim, Seoul (KR)

(73) Assignee: Doosan Infracore Co., Ltd., Incheon (KR)

(*) Notice: Subject to any disclaimer, the term of this patent is extended or adjusted under 35 U.S.C. 154(b) by 1185 days.

(21) Appl. No.: 13/125,727

(22) PCT Filed: Oct. 22, 2009

(86) PCT No.: PCT/KR2009/006124
§ 371 (c)(1),
(2), (4) Date: Apr. 22, 2011

(87) PCT Pub. No.: WO2010/047544
PCT Pub. Date: Apr. 29, 2010

(65) Prior Publication Data
US 2011/0243484 A1    Oct. 6, 2011

(30) Foreign Application Priority Data
Oct. 23, 2008 (KR) .................. 10-2008-0104283

(51) Int. Cl.
| | |
|---|---|
| *C22C 38/08* | (2006.01) |
| *C22C 38/00* | (2006.01) |
| *C22C 38/16* | (2006.01) |
| *F16C 33/10* | (2006.01) |
| *F16C 33/12* | (2006.01) |

(52) U.S. Cl.
CPC ............ *C22C 38/008* (2013.01); *C22C 38/08* (2013.01); *C22C 38/16* (2013.01); *F16C 33/103* (2013.01); *F16C 33/121* (2013.01)

(58) Field of Classification Search
CPC ...... C22C 38/008; C22C 38/16; F16C 33/121
USPC ........................................................ 75/246
See application file for complete search history.

(56) References Cited

U.S. PATENT DOCUMENTS

| | | | | |
|---|---|---|---|---|
| 6,086,257 A | * | 7/2000 | Lee ........................ | 384/279 |
| 2006/0159376 A1 | | 7/2006 | Takayama et al. | |
| 2010/0227188 A1 | * | 9/2010 | Takayama ............... | 428/565 |
| 2012/0177528 A1 | | 7/2012 | Takayama | |

FOREIGN PATENT DOCUMENTS

| | | | |
|---|---|---|---|
| CN | 101107376 A | | 1/2008 |
| CN | 101109411 A | | 1/2008 |
| JP | 2008-202123 | | 9/2008 |
| KR | 1020060056702 A | | 11/2006 |
| KR | 1020080045315 A | | 5/2008 |
| KR | 1020080078537 A | | 8/2008 |
| WO | 2006080554 A1 | | 8/2006 |
| WO | WO 2007086621 A1 | * | 8/2007 |
| WO | 2008062987 A1 | | 5/2008 |

OTHER PUBLICATIONS

Notice of Allowance dated Aug. 27, 2013 for Japanese Patent Application No. 2011-533108, 3 pages.
Search Report dated May 18, 2010 for International Application No. PCT/KR2009/006124, filed Oct. 22, 2009.
Office Action dated Aug. 31 for Chinese Patent Application No. 200980142126.X, 8 pages.
European Search Report dated Aug. 22, 2016 for European Application No. 09822220.1, 8 pages.

* cited by examiner

*Primary Examiner* — Jessee Roe
*Assistant Examiner* — Christopher Kessler
(74) *Attorney, Agent, or Firm* — John D. Veldhuis-Kroeze; Westman, Champlin & Koehler, P.A.

(57) ABSTRACT

The present invention relates to a sliding bearing with improved wear resistance which is manufactured in a sintered body type, and more particularly, to a bush type of sliding bearing that has excellent friction and wear characteristics with a shaft usually made of an iron-based material even under very poor sliding conditions of high-surface pressure, low speed, and irregularity, such that the lubrication cycle of may be extended, and also has excellent hardness such that load feed capability, plastic deformation suppression, and fatigue strength can be improved.

14 Claims, 4 Drawing Sheets

SLIDING BEARING WITH IMPROVED WEAR RESISTANCE AND METHOD OF MANUFACTURING SAME

CROSS-REFERENCE TO RELATED APPLICATIONS

This Application is a Section 371 National Stage Application of International Application No. PCT/KR2009/006124, filed Oct. 22, 2009 and published, not in English, as WO2010/047544 on Apr. 29, 2010.

FIELD OF THE DISCLOSURE

The present disclosure relates to a sliding bearing with improved wear resistance which is manufactured in a sintered body type, particularly a bush type of sliding bearing that allows a shaft inserted therein to smoothly rotate. In more detail, the present disclosure relates to a wear-resistant bush-type of sliding bearing that is manufactured as a sintered body with excellent wear-resistance and load-bearing capacity and can extend a lubrication cycle, and a method of manufacturing the sliding bearing.

BACKGROUND OF THE DISCLOSURE

In general, industrial machines and construction machines have a plurality of movable parts and shaft rotation parts. The movable parts are equipped with bearings, and particularly, the shaft rotation parts are equipped with bush types of sliding bearings that are generally disposed between shafts and shaft holes and reduce frictional resistance between the shafts and the shaft holes, and lubricant is periodically supplied to the parts.

In the related art, brass-based or iron-based bearings are generally used as the bush-types of sliding bearings described above.

Recently, oilless types of sliding bearings that can reduce the frictional resistance between a shaft and a shaft hole without being frequently supplied with lubricant by manufacturing the bush types of sliding bearings in sintered bodies and then impregnating lubricant to the bush types of sliding bearings have been introduced and used as bearings that are available without an extending oil supply interval (lubrication cycle) or supplying oil.

Density of the bearings is maintained by usually dispersing a large amount of soft copper (Cu) particles on martensite made of iron (Fe), but the bearings stick to a shaft that is the counterpart made of an iron (Fe)-based alloy due to friction, when a lubrication layer breaks under a high-surface-pressure and high-temperature sliding condition.

In order to remove the problem, attempts of impregnating various types of lubricants to the bearings have been made, and as an example, it has been proposed in Korean Patent No. 0261369 to impregnate a lubricant having viscosity ranging from 260 to 950 cSt to a bearing.

However, for the bearing, too, of the related art, when the bearing is used under a high-surface-pressure and a low-speed condition, for example, when the bearing is used for a portion requiring high-surface pressure of 3 to 8 kgf/mm$^2$ and low speed of about 1 to 5 cm/sec, as the temperature of the bearing and the periphery is rapidly increased to high temperature by frictional heat, the viscosity of the lubricant decreases, such that inter-metal contact occurs between the iron-based shaft and the iron-based bearing, which is made of the same material as the shaft, and thus frictional characteristic of the bearing decreases.

It is required to frequently supply lubricant to the bearing in order to prevent the problem, in which another problem that the lubrication cycle is reduced occurs.

As described above, the lubricant impregnated to the bearing is generally easily deteriorated under a high-temperature and high-surface-pressure condition and it is difficult to achieve smooth lubrication only with the lubricant, such that inter-metal contact necessarily occurs in this state.

Meanwhile, in inter-metal wear behavior due to the inter-metal contact, plastic deformation of the metal due to high-surface-pressure occurs, in addition to inter-metal sticking due to the high-temperature generated by friction, such that not only abnormal wear of the bearing, but abnormal wear of the shaft, which is the counterpart, are caused; therefore, the entire system of the shaft and the bearing is damaged. In particular, hardness of copper (Cu) that is soft particles dispersed on the martensite made of iron (Fe) is low and severely deformed in plastic deformation, such that wear of the bearing is accelerated.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosed embodiments have been made in an effort to improve wear resistance of a bearing and extend a lubrication cycle of the bearing, by developing a wear resistant sintered body that has a low-friction and high-surface pressure characteristic without plastic deformation under high-surface pressure while showing a low-friction characteristic in friction between a shaft and the bearing, and by manufacturing a sliding bearing by using the sintered body.

An exemplary embodiment of the present disclosure provides a sliding bearing formed by sintering a composite for a sliding bearing including copper (Cu) of 7 to 20 wt %, tin (Sn) of 1 to 7 wt %, carbon (C) of 0.2 to 2.0 wt %, nickel (Ni) of 0.3 to 4 wt %, boron (B) of 0.01 to 0.4 wt %, and the balance of iron (Fe) of the total weight. The sliding bearing according to the present disclosure is manufactured in a sintered body type by sintering, such that it is also referred to as a "sliding bearing sintered body".

The sliding bearing according to the exemplary embodiment of the present disclosure may be a sliding bearing that has a body with an inner hole and the inner hole is implemented as a bush type where a shaft is rotatably inserted. Although the shaft that is applied to the sliding bearing according to the exemplary embodiment of the present disclosure is not specifically limited to the type, for example, a shaft made of iron or metal is possible.

According to the exemplary embodiment of the present disclosure, the sliding bearing composite may further include one or more powders selected from a group of chrome (Cr) of 0.02 to 0.6 wt %, molybdenum (Mo) of 0.05 to 0.5 wt %, vanadium (V) of 0.01 to 0.3 wt %, tungsten (W) of 0.05 to 0.5 wt %, manganese (Mn) of 0.01 to 0.05 wt %, and silicon (Si) of 0.02 to 0.2 wt % of the total weight.

In the exemplary embodiment of the present disclosure, the components of the composite for the sliding bearing, copper (Cu), tin (Sn), carbon (C), nickel (Ni), boron (B), iron (Fe), chrome (Cr), molybdenum (Mo), vanadium (V), tungsten (W), manganese (Mn), and silicon (Si) may be used in a powder type and they can be acquired from powders that are on the market. The components may be used as separate powder types, and alloy powder with two or more components in an alloy type may be purchased and used. When alloy powder is used, it is required to determine the added amount of each of the components by calculating the ratio of each component in the alloy powder.

According to the exemplary embodiment of the present disclosure, the tin (Sn) may be included in a copper-tin alloy (Cu—Sn) powder type. The copper-tin alloy is known as bronze. Since the content of the tin (Sn) is small, a sufficient amount of tin (Sn) can be supplied by the copper-tin alloy, but a sufficient amount of copper (Cu) may not be supplied by the copper-tin alloy. When the copper is not sufficiently supplied by the copper-tin alloy, it is possible to separately add copper powder or add an alloy of copper and another metal. According to the exemplary embodiment of the present disclosure, the content of the tin in the copper-tin alloy may be 20 to 50 wt %.

As another example, boron (B) may be provided by a carbide, such as $B_4C$ bonded with carbon, and may be provided by a boride in B—Ni type bonded with nickel (Ni). Further, the boron may be provided by a boride in B—Cr type bonded with chrome (Cr) and may be provided by a boride in B—Si type bonded with silicon (Si).

The sliding bearing according to the exemplary embodiment of the present disclosure may have appropriate air holes in forming and sintering. According to the exemplary embodiment of the present disclosure, the sliding bearing may be formed such that air holes are formed by 15 to 25 volume % of the entire volume.

Further, it is possible to reduce friction with the shaft when using the bearing by impregnating the air holes of the sliding bearing according to the exemplary embodiment of the present disclosure with lubricant. Therefore, according to the exemplary embodiment of the present disclosure, the sliding bearing may include the lubricant by 15 to 25 volume % of the total volume.

The type of lubricant that is used for the sliding bearing according to the exemplary embodiment of the present disclosure is not specifically limited and those skilled in the art can selectively use appropriate lubricant, if necessary. Obviously, commercially available lubricant can be used.

According to the exemplary embodiment of the present disclosure, as the lubricant impregnated in the air holes, lubricant that has kinematic viscosity within the range of 80 to 1000 cSt and a viscosity index of 150 to 280 at 40° C. may be used. More preferably, lubricant that has kinematic viscosity within the range of 80 to 240 cSt and a viscosity index of 150 to 280 may be used for the sliding bearing.

Meanwhile, if necessary, it is possible to improve properties of the lubricant to be appropriate to specific conditions that are applied to the sliding bearing, by adding various additives to the lubricant.

According to the exemplary embodiment of the present disclosure, the lubricant may further include at least one or more wear resistant extreme pressure additive selected from a group of zinc dithiophosphate, amine phosphate), dithiocarbamates, sulfur compounds, phosphorus compounds, and boron compounds. The wear resistant extreme pressure additive may be added by 0.4 to 6.8 volume % of the total volume of the impregnated lubricant.

In addition, the lubricant may further include at least one or more solid lubricants selected from a group of graphite, molybdenum disulfide ($MoS_2$), polytetrafluoroethylene, and Teflon. The solid lubricant may be added by 1.5 to 25 volume % of the total volume of the impregnated lubricant.

Obviously, it is possible to add the wear resistant extreme pressure additive and the solid lubricant to the lubricant.

Another exemplary embodiment of the present disclosure provides a method of manufacturing a busy type of sliding bearing, the method including: preparing powder for a sliding bearing composite including copper (Cu) of 7 to 20 wt %, tin (Sn) of 1 to 7 wt %, carbon (C) of 0.2 to 2.0 wt %, nickel (Ni) of 0.3 to 4 wt %, boron (B) of 0.01 to 0.4 wt %, and the balance of iron (Fe) of the total weight (S10); mixing the prepared powder (S20); manufacturing a pressurized formed body of a bush type bearing having an inner hole for inserting a shaft, by pressurizing the mixed powder (S30); manufacturing a sintered body by heating and sintering the formed body at temperature of 1000° C. to 1150° C. for 15 to 50 minutes (S40); hardening a fine constitution by treating the sintered body by using at least one or more heat treatment methods selected from a group of carburizing heat treatment, nitriding heat treatment, and high frequency heat treatment (S50); and impregnating lubricant in the hardened sintered body (S60).

According to the exemplary embodiment of the present disclosure, one or more powders selected from a group of chrome (Cr) of 0.02 to 0.6 wt %, molybdenum (Mo) of 0.05 to 0.5 wt %, vanadium (V) of 0.01 to 0.3 wt %, tungsten (W) of 0.05 to 0.5 wt %, manganese (Mn) of 0.01 to 0.05 wt %, and silicon (Si) of 0.02 to 0.2 wt % of the entire powder weight may be further included, in the preparing of powder.

The components of the composite for the sliding bearing, copper (Cu), tin (Sn), carbon (C), nickel (Ni), boron (B), iron (Fe), chrome (Cr), molybdenum (Mo), vanadium (V), tungsten (W), manganese (Mn), and silicon (Si) may be used in a powder type and they can be acquired from powders that are on the market. The components may be used as separate powder types, and alloy powder with two or more components in an alloy type may be purchased and used. When alloy powder is used, it is required to determine the added amount of each of the components by calculating the ratio of each component in the alloy powder.

According to the exemplary embodiment of the present disclosure, the tin (Sn) may be included in a copper-tin alloy (Cu—Sn) powder type.

Further, the formed body may be manufactured such that the internal air hole ratio can be 15 to 25% of the formed body in the manufacturing of a formed body.

According to the exemplary embodiments of the present disclosure, the sliding bearing can achieve an effect of having excellent wear resistance and extending the lubrication cycle, because it is possible to keep optimal friction characteristic even under high temperature and high-surface pressure. Further, when the sliding bearing according to the exemplary embodiments of the present disclosure is used, not only the shaft and the bearing that operate in contact with each other have excellent wear resistance, but load resistance is increased, such that resistance against plastic deformation is improved.

The sliding bearing according to the exemplary embodiments of the present disclosure can be advantageously applied particularly to a shaft made of iron or steel. This is because the sliding bearing according to the exemplary embodiments of the present disclosure has excellent sliding performance particularly for members made of iron or steel.

DETAILED DESCRIPTION

Figure 1:
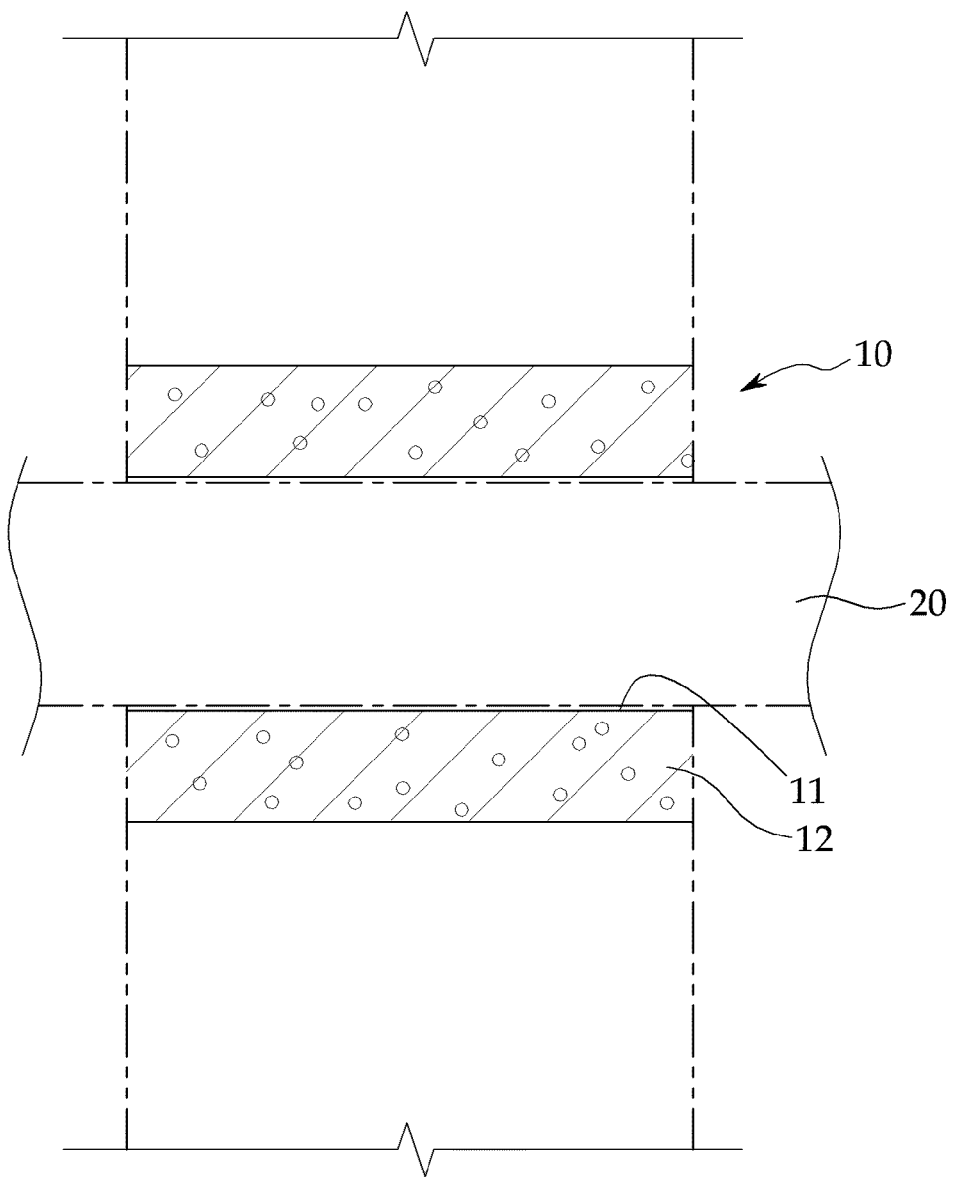
FIG. 1 is a cross-sectional view of a bush type of wear resistant sliding bearing according to an exemplary embodiment of the present disclosure.

<Explanation of Main Reference Numerals and Symbols>

| | |
|---|---|
| 10: Bearing | 11: Inner hole |
| 12: Body | 20: Shaft |
| 30: Sintered body | 31: Ni—Fe-based alloy |
| 32: Boride | 33: Cu |
| 34: Air hole | 35: Inter-metal compound of Cu—Sn |
| 36: Hard alloy | |

Hereinafter, a sliding bearing and a method of manufacturing the sliding bearing according to an exemplary embodiment of the present disclosure are described in detail with reference to the exemplary embodiments.

As an example of a wear resistant sliding bearing according to an exemplary embodiment of the present disclosure, a bush type of sliding bearing 10 shown in FIG. 1 has a body 12 with an inner hole 11 and a shaft 20 is rotatably inserted in inner hole 11 of body 12.

In detail, the sliding bearing according to the exemplary embodiment of the present disclosure has a sintered body type that is manufactured by sintering a composite for a sliding bearing containing copper (Cu) of 7 to 20 wt %, tin (Sn) of 1 to 7 wt %, carbon (C) of 0.2 to 2.0 wt %, nickel (Ni) of 0.3 to 4 wt %, boron (B) of 0.01 to 0.4 wt %, and the balance of iron (Fe), in the total weight.

According to the exemplary embodiment of the present disclosure, the sliding bearing composite may further include one or more selected from a group of chrome (Cr) of 0.02 to 0.6 wt %, molybdenum (Mo) of 0.05 to 0.5 wt %, vanadium (V) of 0.01 to 0.3 wt %, tungsten (W) of 0.05 to 0.5 wt %, manganese (Mn) of 0.01 to 0.05 wt %, and silicon (Si) of 0.02 to 0.2 wt %, in the total weight.

In the exemplary embodiment of the present disclosure, the components, copper (Cu), tin (Sn), carbon (C), nickel, boron (B), iron (Fe), chrome (Cr), molybdenum (Mo), vanadium (V), tungsten (W), manganese (Mn), and silicon (Si), are used in a powder type, and powders on the market may be purchased and used for each of the powders. The components may be used as an independent powder, or alloy powder with two or more components as an alloy type may be purchased and used. When alloy powder is used, it is required to determine the added amount of each of the components by calculating the ratio of each component in the alloy powder.

For the composite for sintering sliding bearing 10, sliding bearing 10 may be manufactured by preparing each component at each weight ratio in a powder state, and then forming and sintering the powder.

The sliding bearing according to the exemplary embodiment of the present disclosure may imply a bearing containing iron (Fe), copper (Cu), and tin (Sn), as the main components.

Iron (Fe) is the main component of the sliding bearing according to the exemplary embodiment of the present disclosure.

Copper (Cu) is added to an iron-based sintered alloy, such that it functions as a binder of the iron (Fe) powder and also keeps a low frictional characteristic. The low frictional characteristic is deteriorated, when the contents of copper is lower than 7 wt %, and the hardness of the sintered body may decreases, when the contents of copper is higher than 20 wt %.

Tin (Sn) keeps density and alloying of the main particles of soft copper (Cu) and iron (Fe) and strengthens soft copper (Cu) by reacting with copper (Cu) into a liquid state in sintering and then producing an inter-metal compound of copper-tin (Cu—Sn). The content of tin (Sn) is in connection with the content of copper and the content of tin (Sn) may be determined in the range of 1 to 7 wt % with respect to the total weight of the powder in consideration of density, alloying, sintering performance or strength of the alloy.

Meanwhile, it is efficient to add tin (Sn) in a copper-tin (Cu—Sn) alloy type in order to produce the inter-metal compound of Cu—Sn in the sintered body. That is, according to the exemplary embodiment of the present disclosure, tin (Sn) may be contained in an alloy (Cu—Sn) powder type of copper and tin. A substance containing tin (Sn) of 25 to 50 wt % may be used as the alloy (Cu—Sn) powder of copper and tin.

A sufficient amount of tin (Sn) can be supplied by the copper-tin alloy because the content is small, while a sufficient amount of copper (Cu) may not be supplied by the copper-tin alloy. When the copper is not sufficiently supplied by the copper-tin alloy, it may be possible to separately add only copper powder or add alloy powder of copper and another metal.

Meanwhile, when the total content of the copper (Cu) powder and the copper-tin (Cu—Sn) alloy powder is larger than 27 wt % of the total weight of the powder, the hardness may be reduced by the reduction in the content of iron (Fe) particles. Further, when the total content of the copper (Cu) powder and the copper-tin (Cu—Sn) alloy powder is lower than 8 wt %, the density and alloying of the iron (Fe) particles are reduced, such that rigidity may be reduced. Therefore, it is preferable that the total content of the copper (Cu) powder and the copper-tin (Cu—Sn) alloy powder is in a range of 8 to 27 wt % with respect to the total weight of the powder.

Nickel (Ni) has an excellent low frictional characteristic in connection to an iron-based material that is the main material of the shaft. When the content of nickel (Ni) is lower than 0.3 wt %, the amount is not sufficient and the low frictional characteristic may not be sufficiently achieved, and when the content is higher than 4 wt %, it interferes with the density and alloying between iron (Fe) and copper (Cu) and between iron (Fe) and a copper-tin (Cu—Sn) alloy, such that sintering density may be reduced. For nickel (Ni), nickel (Ni) may be independently used in a powder type, and may be used in an alloy powder type, together with other components, for example, boron (B), chrome (Cr), and silicon (Si). When it is used in the alloy powder type, the sintering performance may be improved.

Boron (B) is a component that produces a boride that is a strengthening particle increasing hardness. When the content of boron (B) is lower than 0.01 wt %, a boride fails to be produced, and when the content is higher than 0.4 wt %, fragility is caused in the material itself, such that a surface pressure characteristic of the sintered object is deteriorated. For boron (B), although boron (B) may be independently used in a powder type, according to the exemplary embodiment of the present disclosure, an alloy powder type with chrome (Cr), silicon (Si), nickel (Ni) that can provide boron (B) while being decomposed in sintering may be used, and in some cases, boron (B) may be provided by a carbide, such as $B_4C$, or other types of borides. That is, boron may be provided in at least one type selected from a group of independent boron (B), a $B_4C$ type of carbide, B—Ni type of boride, B—Cr type of boride, and B—Si type of boride.

Carbon (C) may be usually provided from graphite and some of carbon may be provided from carbide. Carbon (C) is a component that is added to be dissolved in a solid state in iron (Fe) and hardens iron through heat treatment. When the content is lower than 0.2 wt %, effect of solid solution hardening by heat treatment is very small, and when the content is higher than 2 wt %, it may remain in a graphite state in sintering and have an adverse effect on sintering.

Chrome (Cr) and silicon (Si) are components that can be added in an alloy powder type by making an alloy with nickel (Ni) and boron (B).

Chrome (Cr) is a component that produces a fine carbide. When the content is lower than 0.02 wt %, the effect is very small, and when the content is higher than 0.6 wt %, fragility may be caused in a material.

Silicon (Si) can reduce the melting temperature when it is mixed with nickel (Ni), boron (B), and chrome (Cr) to produce an alloy powder, such that it may be added to smoothly manufacture powder. According to the exemplary embodiment of the present disclosure, it is preferable in manufacturing powder that nickel of 0.02 to 0.2 wt % in the total weight of the composite for sintering the sliding bearing is added.

Chrome (Cr), molybdenum (Mo), vanadium (V), tungsten (W), manganese (Mn), and silicon (Si) powders are classified in tool steel powder and they are particles harder than the martensite of a matrix composed of only iron (Fe) particles, such that they reduce plastic deformation of the matrix and increase wear resistance by being added in an alloy having iron (Fe) as a main component and dispersed. The content range of the tool steel powder is determined in consideration of all of increase in hardness, effect of wear resistance, and sintering performance. When the content is smaller than the content range, hardness and wear resistance is less improved, whereas when the content is higher than the content range, the more the content, the more the characteristic that attacks the counterpart of the bearing is achieved, and if excessive, the sintering performance is reduced.

Figure 2:
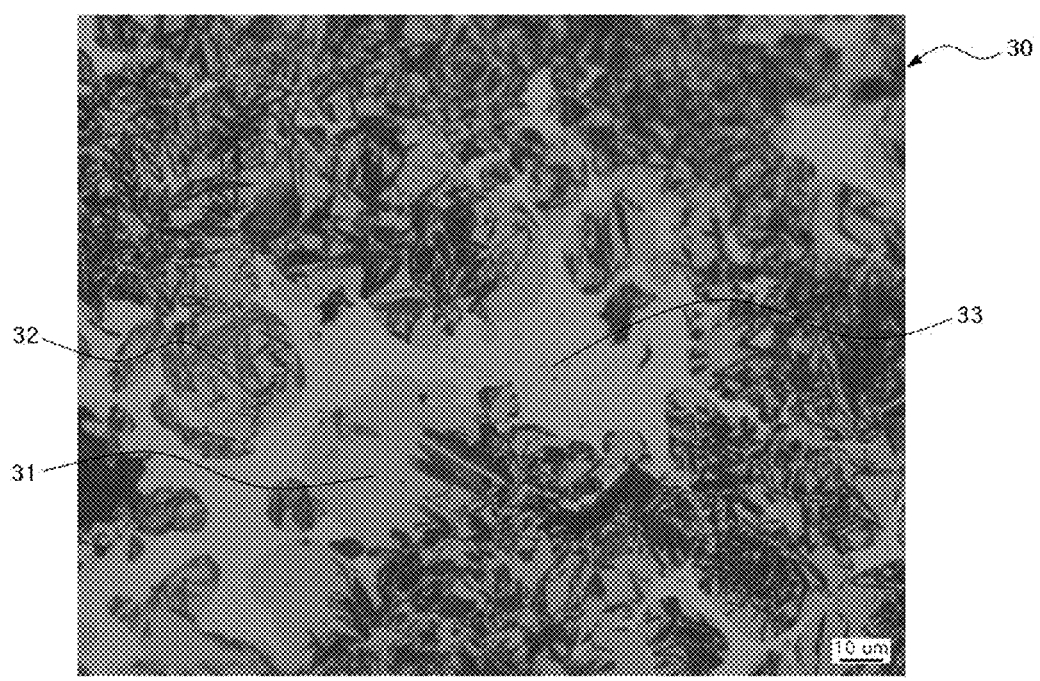
FIG. 2 is a picture taken by a microscope that shows an example of a sintered body constitution of a wear resistant sliding bearing manufactured in a sintered body according to an exemplary embodiment of the present disclosure.
Figure 3:
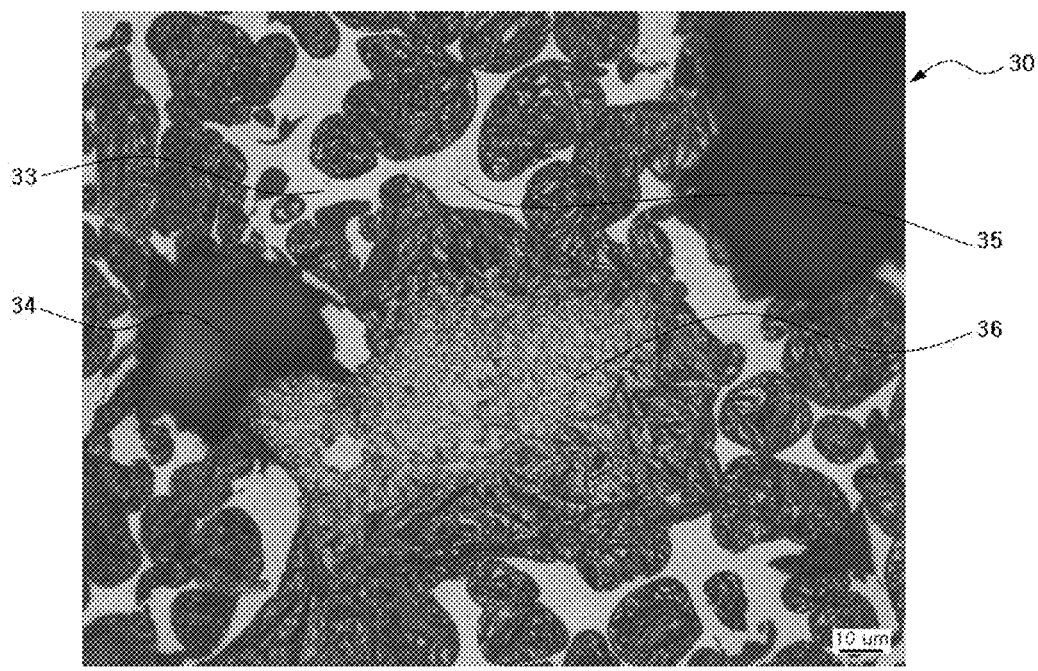
FIG. 3 is a picture taken by a microscope that shows an example of a sintered body constitution of a wear resistant sliding bearing manufactured in a sintered body according to an exemplary embodiment of the present disclosure.

Pictures taken by a metal microscope that shows the internal constitution of the sliding bearing manufactured in a sintered body type by sintering according to the exemplary embodiment of the present disclosure are shown in FIGS. 2 and 3. Referring to FIGS. 2 and 3, it can be seen that a Ni—Fe-based alloy 31 containing a nickel (Ni)-based material having excellent frictional characteristic in connection to an iron-based alloy that is the main material of a shaft that is a counterpart, a boride 32 allowing for high hardness, a plurality of air holes 34, and an inter-metal compound 35 of Cu—Sn are formed in sintered body 30. Further, if necessary, the sintered body may include a hard alloy 36.

A plurality of air holes 34 formed in sintered body 30 may function as spaces for impregnating lubricant and the air holes are formed when the powder composite is formed and sintered. Since the lubricant is impregnated in air holes 34, the bearing can have a more excellent lubrication characteristic. A wear resistant extreme pressure additive may be further added to the lubricant and a solid lubricant may be further included. The lubrication characteristic of the bearing can be improved by the wear resistant extreme pressure additive or the solid lubricant.

According to the exemplary embodiment of the present disclosure, air holes of 15 to 25 volume % of the entire volume of the bearing may be formed in the sliding bearing, and as a result, the bearing can include lubricant as much as 15 to 25 volume % of the entire volume of the bearing.

When the air holes are smaller than 15 volume % of the entire volume of the bearing, a sufficient amount of lubricant is difficult to be included, and when the air holes are larger than 25 volume %, the hardness value of the bearing decreases and plastic deformation is caused in frictional wear, such that the bearing may be damaged.

According to the exemplary embodiment of the present disclosure, as the lubricant, lubricant having kinematic viscosity of 80 to 1000 cSt, preferably 80 to 240 cSt at 40° C., and a viscosity index of 150 to 280 may be used. When the kinematic viscosity is smaller than 80 cSt, the lubricant is too sticky and does not flow out well on the frictional surface when used for the bearing, and when the viscosity is larger than 1,000 cSt, the lubricant is too thin, such that it does not remain well in the air holes. It is advantageous that the viscosity is 240 cSt or less.

Meanwhile, in the sliding bearing of the present disclosure, by increasing the viscosity index of the impregnated lubricant, the lubricant can keep predetermined viscosity even if bearing 10 with the lubricant impregnated rapidly increases in temperature under very extreme conditions, for example, under high-surface pressure of about 3 to 8 kgf/$mm^2$ and low speed of 0.5 to 8 cm/sec.

In particular, if predetermined viscosity is kept under a high-temperature condition, the frictional characteristic and wear resistant characteristic of sliding bearing 10 would not decrease, even if the temperature of sliding bearing 10 rapidly increases to high temperature. Further, since the lubricant keeps the predetermined viscosity even under the high-temperature condition, even if bearing 10 rapidly increases in temperature, not only does the lubricant not leak from air holes 34 of bearing 10, but the lubricant can be impregnated in air holes 34, even if it temporarily leaks. As described above, as the lubricant does not leak from air holes 34 of bearing 10, the impregnated cycle of the lubricant is extended and the lubrication cycle of the lubricant can be extended.

Meanwhile, a wear resistant extreme pressure additive that forms a thin film by reacting with the metal surface may be added to the lubricant. The wear resistant extreme pressure additive prevents direct contact between shaft 20 and bearing 10 by forming the thin film by reacting with the surface of shaft 20. In particular, frictional resistance between shaft 20 and bearing 10 is considerably decreased by preventing direct contact between shaft 20 and bearing 10, and as the frictional resistance between shaft 20 and bearing 10 is considerably reduced, wear resistance of bearing 10 is improved. In the exemplary embodiment of the present disclosure, for example, one or more selected from a group of zinc dithiophosphate, Amine Phosphate), dithiocarbamates, sulfur compounds, phosphorus compounds, and boron compounds may be used as the wear resistant extreme pressure additive. According to the exemplary embodiment of the present disclosure, the wear resistant extreme pressure additive may be added by 0.4 to 6.8 volume % of the entire volume of the impregnated lubricant.

Further, a solid lubricant may be further contained in the lubricant. The solid lubricant is lubricant in a solid powder state or a scalelike solid state that can lubricate by using internal slide of the particle crystal, inter-particle slide, and slide of particles with respect to the frictional surface. As an example of the solid lubricant, there are sulfide-based substances, such as graphite or molybdenum disulfide $MoS_2$ or resin-based substances, such as polytetrafluoroethylene and teflon, and one or more of them can be selectively used. The solid lubricant may be added by 1.5 to 25 volume % of the entire volume of the impregnated lubricant, in order to achieve effect of the solid lubricant.

Figure 4:
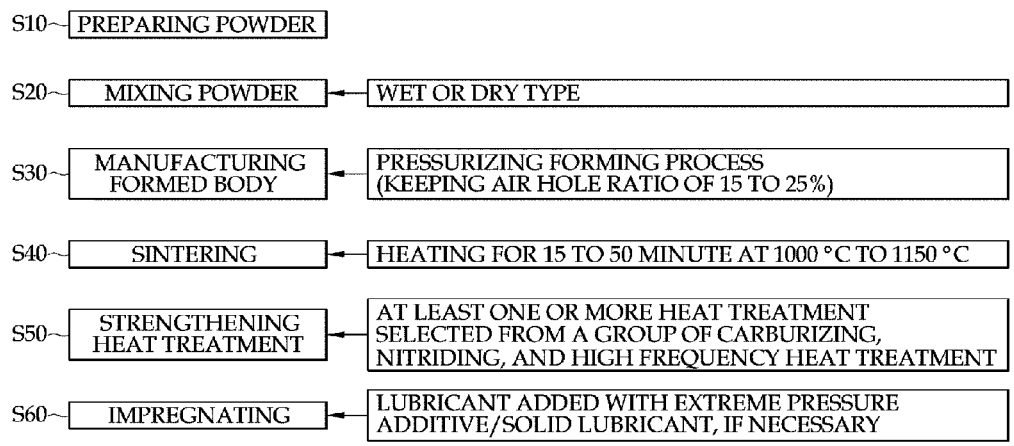
FIG. 4 is a process diagram showing an example of a process of manufacturing a wear resistant sliding bearing manufactured in a sintered body according to an exemplary embodiment of the present disclosure.

A process of manufacturing a sliding bearing according to the exemplary embodiment of the present disclosure is described with reference to FIG. 4.

First, powder for a sliding bearing composite is prepared. In detail, copper (Cu) 7 to 20 wt %, tin (Sn) 1 to 7 wt %, carbon (C) 0.2 to 2.0 wt %, nickel (Ni) 0.3 to 4 wt %, boron (B) 0.01 to 0.4 wt %, and the balance of iron (Fe) of the total weight are prepared in a powder state (S10).

If needed, one or more powder selected from a group of chrome (Cr) 0.02 to 0.6 wt %, molybdenum (Mo) 0.05 to 0.5 wt %, vanadium (V) 0.01 to 0.3 wt %, tungsten (W) 0.05 to 0.5 wt %, manganese (Mn) 0.01 to 0.05 wt %, and silicon (Si) 0.02 to 0.2 wt % of the entire powder weight may be further prepared and used.

As the components, powder type products on the market may be used. The powder may be independent power or alloy type powder on the market. When the alloy type powder is used, it is required to calculate the contents of the powder in consideration of the contents of the components contained in the alloy.

For example, for Ni, Si, B, and Cr, various types of alloy powder products alloyed with two or more of the components on the market may be used. For tin (Sn), a Cu—Sn alloy powder type may be used. In some cases, a powder product where Cr, Mo, V, W, Mn, and Si are added in an alloy type may be used.

The powder prepared as described above is stirred by wet or dry stirring (S20) and pressurized into a formed body (S30).

The shape of the formed body is formed to correspond to the shape of the counterpart that slides, without a specific limit. For example, when a bush type of sliding bearing is manufactured, the formed body may be formed in a ring-shaped bush. However, it should be pressurized such that the air hole ratio can be 15 to 25% for the product characteristics. The pressure that is applied in this case may be 300 to 5,000 kg/cm².

Next, the formed body is heated and sintered at temperature of 1000° C. to 1150° C. for 15 to 50 minutes in a vacuum or gas atmosphere to prevent oxidation, and accordingly, a sintered body is manufactured (S40).

The sintered body is heated by one or more heat treatment methods selected from a carburizing heat treatment, nitriding heat treatment, and high frequency heat treatment such that the fine constitution is hardened (S50).

Next, the hardened sintered body is vacuum-impregnated with lubricant (S60).

The sliding bearing manufactured in a sintered body type according to the exemplary embodiment of the present disclosure is not plastically deformed and keeps a low frictional characteristic even under a high-surface pressure and high-temperature condition, such that the lubrication cycle can be extended.

Further, even if the sintered body is an inner hole and an outer hole is bonded to a metal mother material, the same effect is achieved when the portion where it is in contact with a pin or a shaft is the same sintered body.

The present disclosure is described hereafter in more detail with reference to the Examples and Experimental examples.

Examples 1-3 and Comparative Examples 1-7

Manufacturing of Sliding Bearing

Composite powders for a sliding bearing which contain the components described in the following Table 1 were prepared, the powders were mixed with stearin-based lubricant, and a bush type of formed body were manufactured in a ring shape by pressurizing the mixture under pressure of 3,000 kg/cm². The powders of components described in Table 1 were all products on the market. For example, the iron powder was a Hoganas powder, the copper and copper-tin alloy (Cu30Sn; copper-tin alloy with tin 30 wt %) was a powder by ChangSung Inc., C was a graphite product on the market, Ni and B were B—Ni product by Hoganas, and Si, Cr, Mo, V, W, and Mn were steel metal powders.

Two formed bodies were manufactured for each of the Examples 1-3 and Comparative examples 1-7 and classified into Group 1 and Group 2.

Further, sintered bodies were manufactured by heating and sintering the formed bodies under the same conditions, at temperature of 1100° C. for 25 minutes in a gas atmosphere. The sintering temperature of 1100° C. and the maintaining time are all appropriate to the samples of the Examples 1-3 and Comparative examples 1-7.

The sintered bodies of the Examples 1-3 and the Comparative examples 1-7 were divided into two groups, after sintered at the temperature 1100° C., such that one group has undergone carburizing heat treatment at 900° C. and the other group has not undergone carburizing heat treatment.

TABLE 1

| Example of Example and Comparative Example Composites (wt %) | | | | | | | | | | | |
|---|---|---|---|---|---|---|---|---|---|---|---|
| Component | Fe | Cu | Cu30Sn | C | Ni | B | Si | Cr | Mo | V | W | Mn |
| Example 1 | Bal. | 15 | 5 | 1 | 0.5 | 0.1 | 0.03 | 0.05 | | | | |
| Example 2 | Bal. | 10 | 10 | 1 | 1.2 | 0.2 | 0.07 | 0.1 | | | | |
| Example 3 | Bal. | 10 | 10 | 1 | 1.2 | 0.2 | 0.1 | 0.3 | 0.3 | 0.1 | 0.3 | 0.03 |
| Comparative example 1 | Bal. | 20 | | 1 | | | | | | | | |
| Comparative example 2 | Bal. | 20 | | 1 | 1.2 | 0.2 | 0.07 | 0.1 | | | | |
| Comparative example 3 | Bal. | | 30 | 1 | 1.2 | 0.2 | 0.07 | 0.1 | | | | |
| Comparative | Bal. | 10 | 10 | 1 | 0.2 | 0.01 | 0.01 | 0.02 | | | | |

TABLE 1-continued

Example of Example and Comparative Example Composites (wt %)

| Component | Fe | Cu | Cu30Sn | C | Ni | B | Si | Cr | Mo | V | W | Mn |
|---|---|---|---|---|---|---|---|---|---|---|---|---|
| example 4 | | | | | | | | | | | | |
| Comparative example 5 | Bal. | 10 | 10 | 1 | 5 | 0.5 | 0.3 | 0.4 | | | | |
| Comparative example 6 | Bal. | 10 | 10 | 1 | | | 0.1 | 0.5 | 0.3 | 0.1 | 0.3 | 0.03 |
| Comparative example 7 | Bal. | 10 | 10 | 1 | 1.2 | 0.2 | 0.1 | 1.0 | 0.6 | 0.4 | 0.6 | 0.06 |

Experimental Example 1

Measuring of Hardness

Hardness of the bush type of bearings manufactured by Examples 1-3 and Comparative examples 1-7 was measured. The hardness was measured by a hardness tester that is used to measure hardness of common sintered bodies. The hardness was separately measured for the group that has undergone carburizing heat treatment at 900° C. and the group that has not undergone carburizing heat treatment after sintered, in Examples 1-3 and Comparative examples 1-7. The result was shown in the following Table 3.

TABLE 2

Hardness measurement result and Air hole ratio.

| Component | Hardness with carburizing heat treatment after sintering(HrB) | Hardness without carburizing heat treatment after sintering (HrB) | Air hole ratio (Volume %) | Reference |
|---|---|---|---|---|
| Example 1 | 90 | 51 | 19.5 | |
| Example 2 | 92 | 54 | 19.2 | |
| Example 3 | 94 | 59 | 19.7 | |
| Comparative example 1 | 76 | 38 | 19.6 | |
| Comparative example 2 | 80 | 41 | 21.1 | |
| Comparative example 3 | 71 | 33 | 20.0 | |
| Comparative example 4 | 86 | 45 | 19.0 | |
| Comparative example 5 | 87 | 67 | 29.6 | Fragility caused |
| Comparative example 6 | 84 | 45 | 20.9 | |
| Comparative example 7 | 90 | 52 | 25.2 | |

[Table 2]

It can be seen from Comparative example 1 that it was an alloy that strengthens the matrix of Fe by the composition of the related art, but the hardness was very low because there was no Si that strengthens Cu.

It can be seen from Comparative example 2 that Ni and B powders were contained in the composition of the related art, but a boride was produced by diffusion of B, such that the hardness was improved more than Comparative example 1; however, the increase in hardness was very small because there was no Sn.

In Comparative example 3, although a Cu—Sn alloy powder and Ni and B powders were included, the amount of Cu—Sn alloy is too large, such that the content of Fe decreased and the hardness was reduced.

In Comparative example 4, although the hardness was increased because a Cu—Sn alloy powder and Ni and B powders were included, the increase in hardness was small because the content of Ni was small and the mixed content of Ni—B was small.

Similarly, in Comparative example 5, although the hardness was increased because a Cu—Sn alloy powder and Ni and B powders were included, but the content of Ni and B were large, such that the air holes were unstably formed and fragility was caused.

In Comparative example 6, although the hardness was increased because the Cu—Sn alloy powder and Cr, Mo, V, W, Mn, and Si powders were included, the increase in hardness was small because there were no contents of Ni and B.

In Comparative example 7, although the hardness was increased because the Cr, Mo, V, W, Mn, and Si powders were included, in addition to the Cu—Sn alloy powder and the Ni and B powders, the contents of Cr, Mo, V, W, and Mn were too large, such that sintering performance was deteriorated and the air holes were unstably formed.

As a result, the characteristic of the powders were reflected in Examples 1-3 within the range of the present disclosure, such that excellent hardness was shown and the air holes were appropriately formed, as compared with Comparative examples 1-7.

Further, referring to the experimental results, it can be seen that the hardness is very high after the carburizing heat treatment more than before the carburizing heat treatment. As a result, in the composition of the present disclosure, it can be seen that the load support performance is excellent and plastic deformation can be prevented under high-surface pressure, when hardening heat treatment, such as the carburizing heat treatment, is performed.

Experimental Example 2

Frictional Wear Characteristic Test

Frictional wear characteristic of the bush type of sliding bearings manufactured by Examples 1-3 and Comparative examples 1-7 was tested. In the frictional wear characteristic test, friction coefficients were measured by an exclusive tester that performs a test by mounting a pin in the bearing that is manufactured as described above and used as a bush. The cycle where sticking occurs and the friction coefficient is 0.3 or more was set as a lubrication cycle. Further, the amount of wear was estimated by a difference in height, by measuring the surface roughness inside the bearing after the test was finished.

The friction wear characteristic test was performed only to one group that has undergone carburizing heat treatment at 900° C. after sintered, in the groups manufactured by Examples 1-3 and Comparative examples 1-7. As a detailed test conditions, the high-surface pressure condition was kept at 10 k g/mm$^2$ higher than 2 to 5 kg/mm$^2$ that is the use condition of a common bush in the test, and the speed was 5 cm/sec. The use temperature was maintained at about 50° C. to check the effect with the viscosity of grease kept uniform, and the grease was lithium-based grease and injected only one time before the test.

Table 3 shows a test result without impregnating lubricant in order to estimate the amount of wear and lubrication cycle of the sintered body under the test conditions described above.

TABLE 3

Amount of wear and lubrication cycle for each component

| Component | Whether to impregnate lubricant (Volume %) | Cycle with friction coefficient above 0.3 (Lubrication cycle) | Amount of wear of pin (mm) | Amount of wear of bush (mm) |
|---|---|---|---|---|
| Example 1 | No | 67,000 | 0.21 mm | 0.20 mm |
| Example 2 | No | 71,000 | 0.19 mm | 0.15 mm |
| Example 3 | No | 75,000 | 0.23 mm | 0.14 mm |
| Comparative example 1 | No | 39,000 | 0.35 mm | 0.31 mm |
| Comparative example 2 | No | 46,000 | 0.31 mm | 0.29 mm |
| Comparative example 3 | No | 37,000 | 0.29 mm | 0.45 mm |
| Comparative example 4 | No | 51,000 | 0.30 mm | 0.21 mm |
| Comparative example 5 | — | — | — | — |
| Comparative example 6 | No | 54,000 | 0.37 mm | 0.20 mm |
| Comparative example 7 | No | 66,000 | 0.42 mm | 0.19 mm |

Table 4 shows a test result according to whether to impregnate lubricant and whether to use wear resistant extreme pressure additive and solid lubricant under the test conditions described above. Mineral oil having kinematic viscosity of 221 cSt and 600 cSt was used as the lubricant, zinc dithiophosphate was used as the wear resistant extreme pressure additive, and molybdenum disulfide ($MoS_2$) was used as the solid lubricant, in this test.

TABLE 4

Lubrication cycle change according to lubricant, wear resistant extreme pressure additive, and solid lubricant

| Reference | Component | Lubricant (Volume %) | Wear resistant extreme pressure additive (Volume %) | Solid lubricant (Volume %) | Cycle with friction coefficient above 0.3 |
|---|---|---|---|---|---|
| | Example 1 | Not impregnated | Not added | Not added | 67,000 |
| | | Impregnated (15%, 221 cSt) | Not added | Not added | 93,000 |
| | | Impregnated (15%, 221 cSt) | Added (2%) | Not added | 108,000 |
| | | Impregnated (15%, 600 cSt) | Added (2%) | Not added | 80,000 |
| | | Impregnated (15%, 221 cSt) | Added (2%) | Added (4%) | 112,000 |
| | Example 2 | Impregnated (15%, 221 cSt) | Added (2%) | Added (4%) | 121,000 |
| | Comparative example 1 | not impregnated | Not added | Not added | 39,000 |
| | | Impregnated (15%, 221 cSt) | Not added | Not added | 51,000 |
| | | Impregnated (15%, 221 cSt) | Added (2%) | Not added | 61,000 |
| | | Impregnated (15%, 600 cSt) | Added (2%) | Not added | 48,000 |
| | | Impregnated (15%, 221 cSt) | Added (2%) | Added (4%) | 65,000 |
| | Comparative example 2 | Impregnated (15%, 221 cSt) | Added (2%) | Added (4%) | 78,000 |

According to the test results shown in Table 3 and Table 4, it can be seen that in the bearing according to the present disclosure, as compared with the bearings according to Comparative example 1 and other Comparative examples, which are bearings of the related art, considerably excellent wear resistance characteristic was shown and the lubrication cycle was improved, in which the lubrication cycle becomes long.

In particular, comparing the test results of Example 1 and Comparative example 1 in Table 4, it can be seen that the lubrication cycle is shorter than when the lubricant, wear resistant extreme pressure additive, and solid lubricant was not added to the bearing manufactured in Example 1 according to the present disclosure, even if the lubricant, wear resistant extreme pressure additive, and solid lubricant were added to the bearing manufactured Comparative example 1.

Further, in the bearing manufactured in Example 1 according to the present disclosure, it can be seen that the lubrication cycle was increased, when the lubricant, wear resistant extreme pressure additive, and solid lubricant were added. Meanwhile, it is apparent that components other than the components described above, such as synthetic oil for the added lubricant, amine phosphate, dithiocarbamates, and sulfide compound for the wear resistant extreme pressure additive, and graphite (C) for the solid lubricant are also effective.

Therefore, when the bearing manufactured by the bearing sintered body according to the present disclosure is used, it is possible to not only improve the frictional characteristic with an iron-based shaft made, but prevent plastic deformation even under high-surface pressure by forming a high-strength boride in the Fe particle that is a sintered body matrix and forming a Cu—Sn inter-metal compound in Cu. Further, it is possible to further improve hardness and frictional characteristics when a predetermined content of hard alloy is added, because it is mixed with other constitution.

The present disclosure is applied to manufacturing of a sliding bearing and a bearing according to the exemplary embodiment of the present disclosure is applied to various mechanical machines.

Although the present invention has been described with reference to preferred embodiments, workers skilled in the art will recognize that changes may be made in form and detail without departing from the spirit and scope of the invention.

The invention claimed is:

1. A sliding bearing formed by sintering a composite for a sliding bearing comprising copper (Cu) of 7 to 20 wt %, tin (Sn) of 1 to 7 wt %, carbon (C) of 0.2 to 2.0 wt %, nickel (Ni) of 0.3 to 4 wt %, boron (B) of 0.01 to 0.4 wt %, chrome (Cr) of 0.02 to 0.6 wt %, and the balance of iron (Fe) of the total weight,
   wherein a Ni—Fe-based alloy containing a nickel (Ni)-based material, a boride, a plurality of air holes, copper and an inter-metal compound of Cu—Sn are formed in the sliding bearing,
   wherein the air holes are impregnated with lubricant and the lubricant has kinematic viscosity within a range of 80 to 240 cSt and a viscosity index of 150 to 280 at 40° C., wherein the sliding bearing composite comprises the tin (Sn) in a form of copper-tin alloy (Cu—Sn) powder, and the content of the tin in the copper-tin alloy is 20 to 50 wt %, and
   wherein the slide bearing composite comprises a copper (Cu) powder, and the copper (Cu) powder and the copper-tin (Cu—Sn) alloy powder is in a range of 8 to 27 wt % with respect to the total weight of the powders.

2. The sliding bearing of claim 1, wherein the sliding bearing has a body with an inner hole where a shaft is rotatably inserted, the sliding bearing being bushing.

3. The sliding bearing of claim 1, wherein the sliding bearing composite further comprises one or more selected from a group of vanadium (V) of 0.01 to 0.3 wt %, tungsten (W) of 0.05 to 0.5 wt %, and manganese (Mn) of 0.01 to 0.05 wt %, and silicon (Si) of 0.02 to 0.2 wt % of the total weight.

4. The sliding bearing of claim 1, wherein the sliding bearing has air holes therein by 15 to 25 volume % of the entire volume.

5. The sliding bearing of claim 1, wherein the lubricant includes one or more wear-resistant extreme pressure additives selected from a group of zinc dithiophosphate, amine phosphate, dithiocarbamates, phosphorus compounds, and boron compounds, by 0.4 to 6.8 volume % of the total volume of the lubricant.

6. The sliding bearing of claim 5, wherein the lubricant includes one or more solid lubricants selected from a group of polytetrafluoroethylene and teflon, by 1.5 to 25 volume % of the total volume of the lubricant.

7. The sliding bearing of claim 1, wherein the inter-metal compound of Cu—Sn is formed in the copper.

8. A sliding bearing formed by sintering a composite for a sliding bearing comprising copper (Cu) of 7 to 20 wt %, tin (Sn) of 1 to 7 wt %, carbon (C) of 0.2 to 2.0 wt %, nickel (Ni) of 0.3 to 4 wt %, boron (B) of 0.01 to 0.4 wt %, chrome (Cr) of 0.02 to 0.6 wt %, and the balance of iron (Fe) of the total weight,
   wherein a Ni—Fe-based alloy containing a nickel (Ni)-based material, a boride, a plurality of air holes, copper and an inter-metal compound of Cu—Sn are formed in the sliding bearing,
   wherein the sliding bearing composite comprises the tin (Sn) in a form of copper-tin alloy (Cu—Sn) powder, and the content of the tin in the copper-tin alloy (Cu—Sn) powder is 20 to 50 wt %, and
   wherein the slide bearing composite comprises a copper (Cu) powder, and the copper (Cu) powder and the copper-tin (Cu—Sn) alloy powder is in a range of 8 to 27 wt % with respect to the total weight of the powders.

9. The sliding bearing of claim 8, wherein the inter-metal compound of Cu—Sn is formed in the copper.

10. The sliding bearing of claim 8, wherein the sliding bearing composite further comprises one or more selected from a group of vanadium (V) of 0.01 to 0.3 wt %, tungsten (W) of 0.05 to 0.5 wt %, manganese (Mn) of 0.01 to 0.05 wt %, and silicon (Si) of 0.02 to 0.2 wt % of the total weight.

11. The sliding bearing of claim 8, wherein the sliding bearing has air holes therein by 15 to 25 volume % of the entire volume.

12. The sliding bearing of claim 11, wherein the air holes are impregnated with lubricant and the lubricant has kinematic viscosity within a range of 80 to 240 cSt and a viscosity index of 150 to 280 at 40° C.

13. The sliding bearing of claim 12, wherein the lubricant includes one or more wear-resistant extreme pressure additives selected from a group of zinc dithiophosphate, amine phosphate, dithiocarbamates, phosphorus compounds, and boron compounds, by 0.4 to 6.8 volume % of the total volume of the lubricant.

14. The sliding bearing of claim 13, wherein the lubricant includes one or more solid lubricants selected from a group of polytetrafluoroethylene and teflon, by 1.5 to 25 volume % of the total volume of the lubricant.

* * * * *